United States Patent

[11] 3,584,179

[72] Inventor Lloyd A. Schroeder
 Southfield, Mich.
[21] Appl. No. 822,892
[22] Filed May 8, 1969
[45] Patented June 8, 1971
[73] Assignee Automotive Pattern Co.
 Detroit, Mich.

[54] EDM ELECTRODE CONSTRUCTION AND METHOD OF MAKING SAME
 22 Claims, 8 Drawing Figs.
[52] U.S. Cl. ................................................. 219/69
[51] Int. Cl. ................................................. B23k 9/16
[50] Field of Search ........................................... 219/69 E

[56] References Cited
UNITED STATES PATENTS
2,861,164 11/1958 Stegler .................. 219/69(E)
3,058,895 10/1962 Williams .................. 219/69(E)

Primary Examiner—J. V. Truhe
Assistant Examiner—Hugh D. Jaeger
Attorney—Harness, Dickey & Pierce ABSTRACT: An electrode construction for use in operative association with electrical discharge machines, and method of making same, the electrode comprising a plurality of adjacently oriented cooperable segmental electrode sections arranged so as to define a working surface having a conformation corresponding to the shape to which a workpiece is to be machined; a support structure or holder member adapted to operatively support the electrode sections in a manner such that said sections may be removed and replaced after they have become excessively eroded or otherwise consumed; the method of making the electrode including the steps of providing a mold or form having a face portion of the same conformation as the ultimate shape to which the workpiece is to be machined; providing a parting or release substance on the face portion of the form and thereafter arranging the plurality of electrode sections on the form; providing a deformable material on one side of the holder member and biasing said member toward and into engagement with the electrode sections in a manner such that the material is deformed so as to define a reference surface upon which the electrode sections may be detachably mounted.

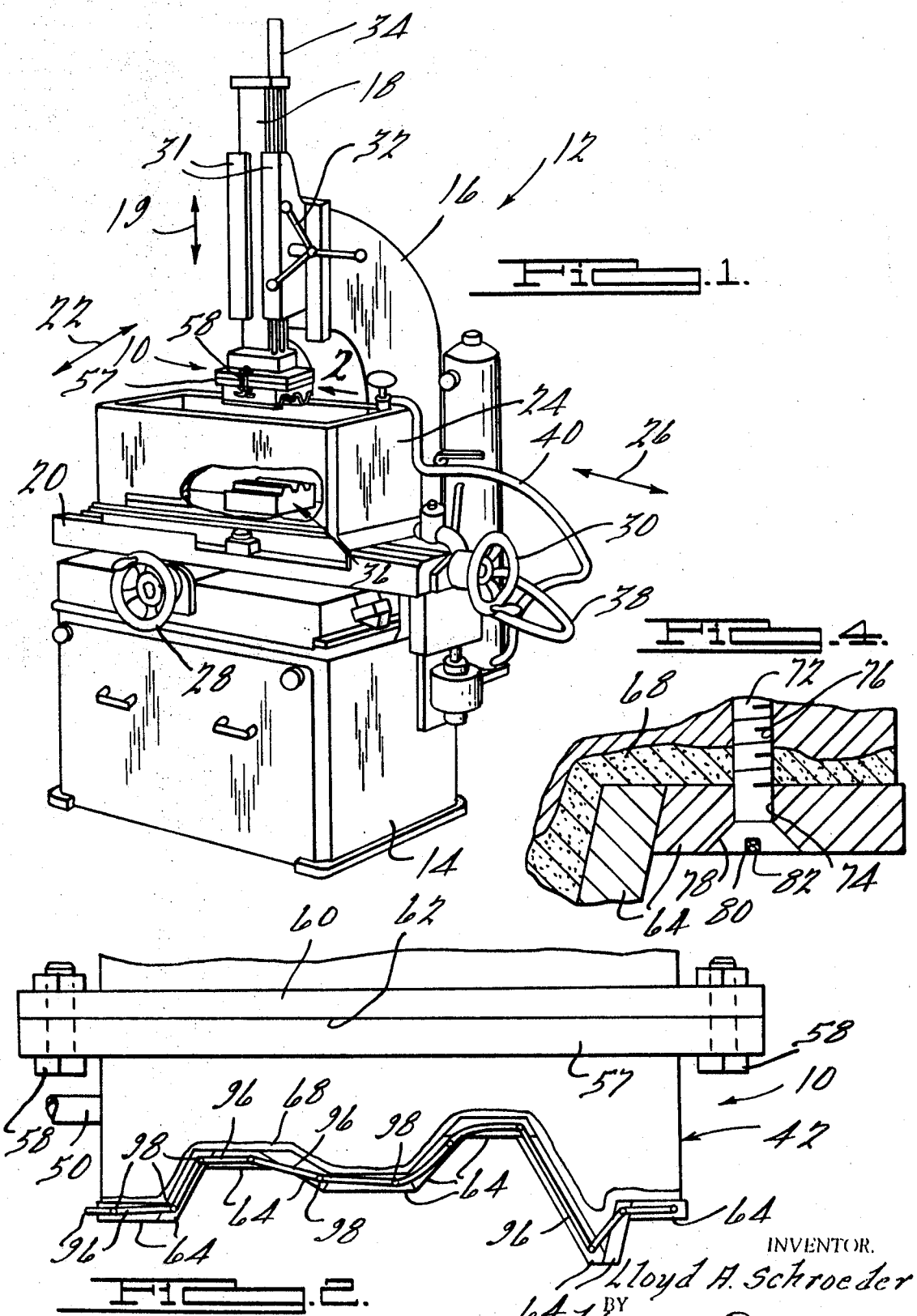

EDM ELECTRODE CONSTRUCTION AND METHOD OF MAKING SAME

BACKGROUND OF THE INVENTION

In electrical discharge machining, the tooling portion of the electrode is provided with a working face having a configuration to which a metal workpiece is to be conformed. The electrode and workpiece are associated with an electrical circuit which includes an electrical power source. When the working face of the electrode and the selected surface of the workpiece to be machined are brought into a predetermined spaced relationship in the presence of a dielectric medium, a series of electrical sparks are discharged across the gap between the working face of the electrode and the surface of the workpiece. These electrical sparks erode the metal of the workpiece, thereby machining or shaping the surface thereof into conformance with the working face of the electrode. The dielectric fluid is circulated between and around the working face of the electrode and the machined surface of the workpiece to prevent overheating of either the electrode or the workpiece, and to carry away the metal particles machined from the workpiece.

One of the problems posed in EDM machining is that, although the electrical sparks or discharges remove or erode metal particles from the workpiece, they also erode the working face of the electrode so that said face is eventually destroyed or seriously impaired. It has been the usual practice to individually machine the working face of each electrode to arrive at the preselected conformation thereof. In most cases, the tooling or face portion is an integral part of the electrode body, with the result that the entire electrode must be frequently replaced during the machining of a workpiece after such time as the effectiveness of the working face of the electrode has been sufficiently impaired.

It will be apparent that when the working face of the electrode is of a relatively complex configuration, i.e., three dimensional, nondevelopable, etc., the electrode will be relatively expensive to manufacture, since a substantial amount of machining and hence finishing is required. Since such an electrode, for all practical purposes, has a relatively short working life, the necessity for individually machining replacement electrodes contributes greatly to the overall cost of electrical discharge machining operations. Moreover, while electrodes made of certain "exotic" metals, such as tungsten and the like are capable of relatively long use, such electrodes are extremely difficult to produce and are relatively expensive.

The present invention is intended to overcome and obviate the various objectionable characteristics hereinabove stated with regard to EDM electrodes through the provision of a novel electrode construction, and method of making same, which utilizes certain expendable and reusable parts. More particularly, the present invention provides a new and improved electrode construction comprising a plurality of segmental electrode sections which are fabricated of an expendable conductive material and are adapted to be mounted on a permanently formed reusable electrode holder for positioning the electrode sections and operatively supporting the same in an associated electrical discharge machine. The associated electrode holder is fabricated in a manner such that it defines a reference surface or face upon which the electrode sections are detachably secured, with the result that when certain electrode sections are removed for purposes of replacement, successive electrode sections may be mounted upon the reference face and thereby be accurately positioned with respect to one another so as to define a precision working face adapted to perform a machining operation on preselected surfaces of workpieces subjected to the operation of the electrical discharge machine, as will hereinafter be described in detail.

SUMMARY OF THE INVENTION

This invention relates generally to electrical discharge machining devices and, more particularly, to a new and improved electrical discharge machining electrode and method of making the same.

It is accordingly a general object of the present invention to provide a new and improved electrode construction for electrical discharge machines.

It is another general object of the present invention to provide a new and improved method of manufacturing electrodes for the aforesaid applications.

It is a more particular object of the present invention to provide a new and improved composite electrical discharge machine electrode having a reusable support member adapted to detachably and operatively support a plurality of replaceable or expendable segmental electrode sections.

It is another object of the present invention to provide an electrode construction of the above character wherein certain of the electrode sections may be connected to power sources of different magnitudes so that different amperages may be simultaneously applied to different areas of a workpiece.

It is still another object of the present invention to provide a new improved electrode construction of the above character wherein the support member constitutes a dielectric fluid manifold chamber.

It is a further object of the present invention to provide an electrode construction wherein the support member includes a new and improved means defining a reference surface upon which the segmental electrode sections may be detachably mounted.

It is a related object of the present invention to provide a support member with a deformable material which, when initially engaged with the electrode sections, is deformed to a conformation defining the aforesaid reference surface.

It is a further object of the present invention to provide an electrode construction of the above-described type wherein auxiliary fastening means, such as screws, adhesive or the like, may be used for securing the electrode sections upon the reference surface.

It is yet another object of the present invention to provide a new and improved electrode construction of the above type wherein the segmental electrode sections may be fabricated of different electrode materials.

Another object of the present invention is to provide an electrode construction of an extremely simple design which is adapted particularly for machining partings for tools, dies, and the like.

Other objects and advantages of the present invention will become apparent from the following detailed description taken in conjunction with the accompanying drawings.

BRIEF DESCRIPTION OF THE DRAWINGS

FIG. 1 is an elevated perspective view of the electrode construction of the present invention, as shown in operative association with a typical electrical discharge machine;

FIG. 2 is a side elevational view of the electrode construction shown in FIG. 1, as taken in the direction of the arrow 2 therein;

FIG. 4 is an enlarged fragmentary view of a portion of one of the fastening means utilized in detachably securing an electrode section to the electrode holder of the present invention;

DETAILED DESCRIPTION OF A PREFERRED EMBODIMENT

Figure 3:
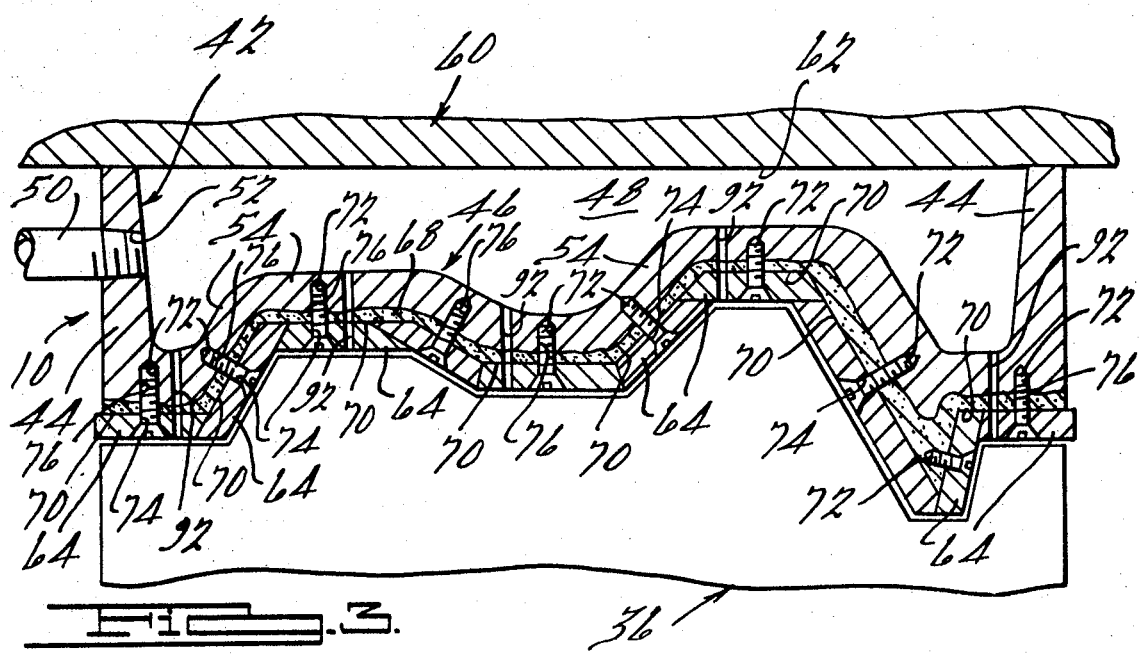
FIG. 3 is a transverse cross-sectional view through the electrode construction of the present invention, as seen in operative association with a typical workpiece.
Figure 5:
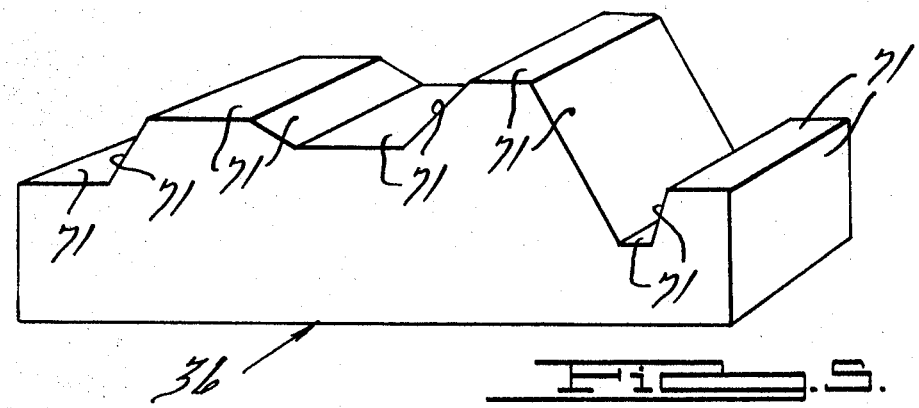
FIG. 5 is an elevated perspective view of a typical workpiece with which the electrode construction of the present invention may be operatively associated.

Referring now in detail to the drawings, an electrode assembly 10, in accordance with a preferred embodiment of the present invention, is shown in operative association with an electrical discharge machine 12 having a base or support structure 14 upon which an upwardly extending frame 16 is disposed for supporting a vertically reciprocable electrode supporting head 18. As illustrated in FIG. 1, the electrode assembly 10 is mounted on the lower end of the head 18 and is thereby supported for reciprocal movement in the direction of the arrow 19. The support structure 14 also comprises a generally horizontally disposed machine table 20 which is movable in a forward and rearward direction, as indicated by the arrow 22. The machine table 20 supports a dielectric fluid reservoir 24 which is movable transversely of the structure 14 in the direction indicated by the arrow 26. Suitable control means such as a drive screw (not shown) operable upon rotation of a handwheel 28 may be used for effecting movement of the table 20, while movement of the reservoir 24 may be controlled through suitable movement of an additional handwheel 30. The electrode supporting head 18 may be manually moved vertically within suitable guide means 31 on the frame 16 by means of a rack and pinion arrangement (not shown) connected to a movable handle 32, or alternatively, may be moved automatically by a suitable electric servomechanism operable in conjunction with a conventional hydraulic cylinder 34.

In operation, a typical workpiece, generally designated herein by the numeral 36, is placed within the reservoir 24 beneath the electrode assembly 10. A fluid dielectric is communicated into the reservoir 24 (or alternatively, into the electrode assembly 10, as will be described) through suitable conduit means 38 and 40. An electrical potential is provided between the workpiece 36 and the electrode assembly 10 until a material eroding spark passes or is discharged from the assembly 10 to the workpiece 36. A predetermined gap or spacing is maintained between the side of the workpiece 36 being machined and the working surface of the electrode assembly 10 by moving the assembly 10 vertically relative to the workpiece 36 by means of the head 18, whereby material will be removed or eroded from the workpiece 36 in a manner well known in the art. It will be noted that the general structure and operation of the electrical discharge machine 10 is well known in the art, and therefore a detailed description of the construction and operation thereof will be omitted for purposes of simplicity, since the invention described herein deals particularly with the electrode construction 10 per se and the method of making the same.

Generally speaking, the electrode assembly 10 comprises an electrode holder which is adapted to be mounted upon the head 18 of the machine 12 and operatively support a plurality of segmental electrode sections in a manner such that said sections may be conveniently removed from the holder and replaced when they become consumed, with the result that after extended use of the electrode construction 10, a major part of the assembly is reusable by merely substituting new segmental electrode sections on the working face of the electrode holder, thereby maximizing the economies of operation. As will hereinafter be described, the electrode sections are adapted to be secured upon a permanent reference surface defined on the lower side of the electrode holder, which surface is formed upon operatively mounting the initial electrode sections in place upon the holder, with suitable auxiliary fastening means being employed where necessary to detachably secure the electrode sections in their respective operative positions.

The electrode holder is generally designated by the numeral 42 and comprises a plurality of upstanding side sections, generally designated 44, that are connected at their lower ends to a generally horizontally disposed electrode support section 46. The sections 44, 46 cooperate with one another to define a fluid chamber 48 into or from which dielectric fluid may be communicated via suitable fluid fitting means 50 threadably mounted within a suitable bore 52 on one of the side sections 44, as best seen in FIG. 3. The fitting means 50 may be communicable through any suitable conduit means, for example, conduit means 38, 40, to a suitable source of dielectric fluid, as will be apparent. The electrode holder 42 may be fabricated of any relatively strong, rigid, electrically conductive or nonconductive material, such as any one of a number of well-known synthetic plastic materials, or alternatively, of a composition material such as are manufactured and distributed under the name Masonite, or other materials which are easy to fabricate so as to create the desired geometry of the member 42. One construction which has been found to be particularly satisfactory is where the sections 44, 46 are fabricated of a honeycomb structure which provides a strong lightweight construction that is extremely economical to manufacture and convenient to assemble. In the embodiment illustrated herein, the electrode holder 42 is fabricated of a metal casting, with the result that the side sections 44 and electrode support section 46 are integrally connected to one another. In a preferred construction of the present invention, the electrode holder 42 may be fabricated of a suitable metal casting or of the above described honeycomb material, whichever material proves most satisfactory for a particular application.

Figure 7:
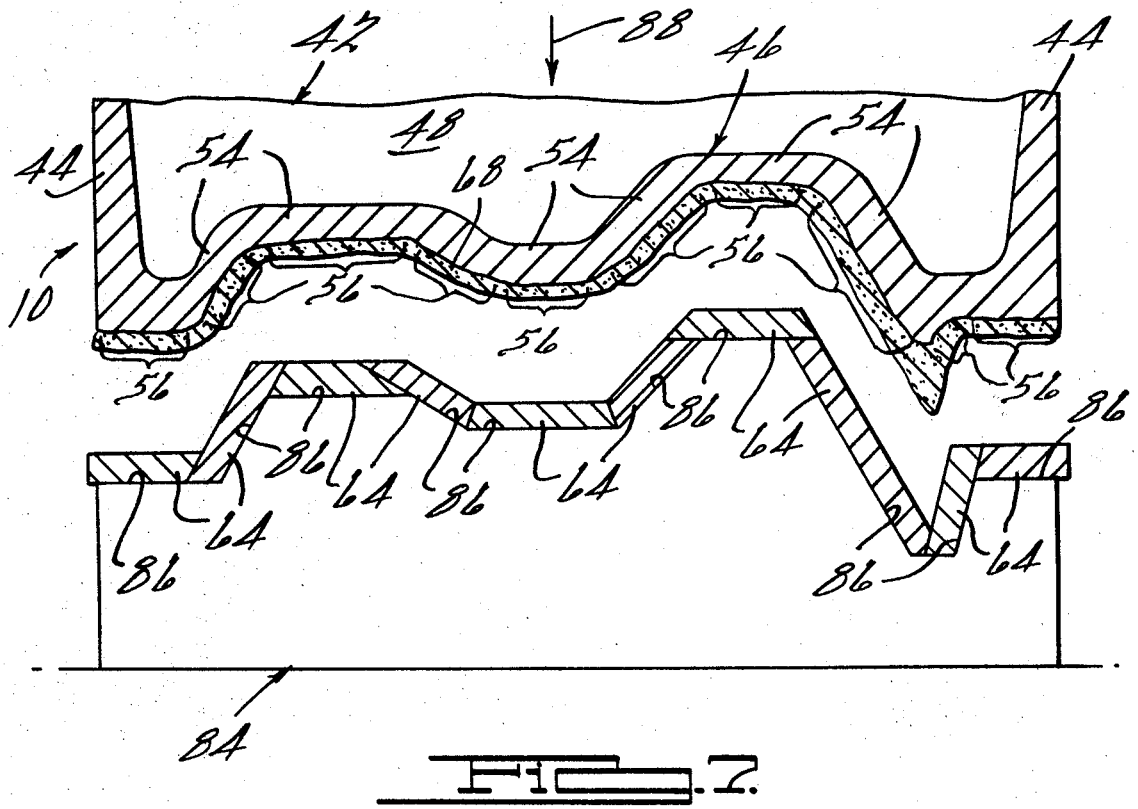
FIG. 7 is a side elevational view of the electrode holder, electrode support pattern and segmental electrode sections as they would be seen prior to mounting the electrode sections on the electrode holder.

As illustrated in FIG. 3, the electrode section 46 comprises a plurality of upwardly inclined or offset, integrally or otherwise connected facet portions, generally designated 54, that generally assume a configuration corresponding to the shape of the workpiece 36 which is to be electrically machined via the assembly 10. The lower sides of the portions 54, as seen in FIG. 7, define a plurality of surface areas, generally designated 56, which are of an initial shape generally corresponding to the shape of the workpiece and upon which the plurality of segmental electrode sections, hereinafter to be described, are operatively mounted. It will be noted that the specific conformation of the surface areas 56 is not particularly critical, within predetermined limitations, with the result that the electrode support section 46 may be fabricated by means of "rough" casting techniques, well known in the art, with the surface areas 56 not requiring any expensive precision machining in order to prepare said areas 56 for operative reception of the electrode sections, thereby minimizing the cost of manufacturing the electrode holder 42.

The holder 42 may be secured by means of an outwardly projecting flange portion 57 on the holder 42 and suitable screws, bolts or the like 58 to a support member 60 defining a flat horizontally extending lower surface 62 against which the upper ends of the side sections 44 are abuttingly engaged, the member 60 being secured by any suitable means upon the lower end of the head 18 of the machine 12 and serving to close the upper side of the chamber 48, as will be apparent.

The plurality of segmental electrode sections, generally designated by the numeral 64, will be seen as being of a generally flat or planar, uniformly thick configuration and arranged or operatively mounted upon the electrode holder 42 such that they are in generally edge abutting relationship, as illustrated in FIG. 3. More particularly, the electrode sections 64 are arranged such that they define a lower working surface which is of the exact shape or conformation as the surface which is to be machined upon the workpiece, such as the workpiece 36. Accordingly, the various confronting edge portions between the electrode sections 64 are shaped, as by beveling, chamfering, or the like, such that the lower side of the totality of the sections 64 presents a surface corresponding to the conformation to the workpiece. It will be apparent, of course, that any skilled artisan will readily be able to cut and properly shape the electrode sections commensurate with the conformation of the associated workpiece, and that the various electrode sections 64 shown and described herein are merely for purposes of illustration.

The segmental electrode sections 64 may be fabricated of any suitable electrically conductive material, but in a preferred construction of the present invention, are fabricated of graphite or carbon which is both convenient to fabricate and economical to commercially manufacture. When the electrode sections 64 are thus fabricated of graphite or carbon, said sections 64 are preferably dimensioned so as to be approximately 0.25 inch in thickness which is selected as being a satisfactory compromise between ease in manufacturing, handling and the like, and cost of the electrode material. Where certain applications so dictate, the electrode sections 64 may be fabricated of various materials other than graphite or carbon, such as brass, copper, tungsten-carbide, or other suitable electrically conductive material, with one particular feature of the present invention residing in the fact that for a given electrode assembly 10, the electrode sections 64 may be fabricated of different materials. Such a feature will find particularly useful application, for example, where it is desired to provide an electrode section 64 which is more resistant to wear or erosion at a location on the electrode assembly 10 where one edge of the particular electrode section does predominately the major part of machining a certain surface area on the associated workpiece. For example, in the electrode assembly 10 described herein, all of the electrode sections 64 might be fabricated of carbon, with the exception of the electrode section 64' and 64'', which, for example, might be fabricated of tungsten-carbide. Since the electrode sections 64', 64'' have the lower leading edges thereof accomplishing a major portion of the machining on the associated surface areas of the workpiece 36 as the electrode assembly 10 moves vertically downwardly during a typical machining operation, and since the remaining of the electrode sections 64 accomplish their respective machining operations by exposing a major portion of their sides (instead of edges) to the workpiece, the rate of erosion or wear of said remaining electrode sections 64 will be somewhat less than the rate of wear of the electrode sections 64', 64'', with the result that by using a harder or more erosion resistant electrode material for the electrode sections 64', 64'', and a relatively softer or erosive material for the remaining electrode sections 64, the overall rate of consumption or wear of all the electrode sections 64 will be substantially equalized so as to minimize "down" time for electrode replacement.

In accordance with one of the principles of the present invention, disposed between the rearward or upper sides of the plurality of electrode sections 64 and the surface areas 56 defined by the portions 54 of the electrode holder 42 is a layer of material, generally designated 68, which functions to provide or define a plurality of generally planar mounting surfaces, generally designated 70, corresponding one with each of the surface areas 56 and with each of a plurality of areas or face portions 71 defined on the workpiece 36 and which are to be machined or formed by means of the electrode assembly 10. The material 68, for purposes of convenience of description, is generally referred to herein as "grout," but need not necessarily be a plasterlike composition as grout is commonly understood to be. Instead, the term grout, as used herein, may consist of any suitable relatively deformable or cold flow material which may be provided on the various surface areas 56 and adapted to deform when engaged with the upper sides of the electrode sections 64 so as to form and thereby define the various mounting surfaces 70. In a preferred construction of the present invention, the grout 68 is selected from the group of thixotropic plastics, ceramics, modeling plaster or the like which may or may not be of a thermosetting character and is adapted, when placed upon the various surface areas 56, to make a permanent bond therewith, yet will not permanently bond to the electrode sections 64 when engaged therewith. As will be described in connection with the overall process of making the electrode assembly 10 of the present invention, as the grout 68 is initially engaged with the various electrode sections 64, it deforms or flows into a configuration defining the plurality of surfaces 70, the totality of which constitute a permanent reference surface upon which not only the original or initial electrode sections 64 may be mounted, but which upon all additional electrode sections 64 that may be subsequently utilized as replacements for the original sections 64 may be mounted. Therefore, the grout 68 defines on the electrode holder 42 the aforesaid reference surface automatically upon the initial mounting of the electrode sections 64 thereon, which reference surface will be seen to be accurately oriented with respect to both the holder 42 and the surface of the workpiece to be machined, since the grout 68, by virtue of its preferred cold flow characteristics, will flow or be forced into and around the peripheral edges of the upper or rearward sides of the electrode sections 64 upon engagement therewith. It will be noted that the grout material 68 provides a continuous bearing area against or upon which the electrode sections 64 may be contiguously, and therefore, firmly mounted with respect to the holder 42.

The plurality of electrode sections 64 are adapted to be fixedly secured to their respective surfaces 70 defined by the grout material 68 by any suitable means which permits the sections 64 to be selectively removed in order to provide for a replacement or substitution thereof. By way of example, a suitable adhesive material may be used which, at normal operative temperatures functions to positively bond the electrode sections 64 to the surfaces 70, but when the temperature of the adhesive is elevated some predetermined amount, said adhesive material will release the electrode sections 64 for purposes of replacement. In the embodiment illustrated herein, however, the electrode sections 64 are adapted to be detachably secured to the surfaces 70, and hence to the electrode holder 42, by means of suitable screws, bolts or the like, generally designated 72, which extend through suitable apertures 74 (see FIG. 4) formed in the electrode sections 64 and are threadably received within suitable bores 76 formed in the electrode holder 42, or in some cases in the grout 68, as is the case in connection with the electrode section 64'. In order to provide a smooth and continuous working surface on the lower side of the electrode sections 64 which confront and accomplish the actual machining on the workpiece 36, the heads of the screws, bolts or the like 72 are preferably recessed or countersunk flush with the surface of the sections 64 via suitable recesses or counterbores 78, in a manner well known in the art, with the heads of the screws, bolts or the like 72, if slotted, being provided with a suitable filler means in order to further the effort toward providing a smooth continuous surface on the electrode sections 64. By virtue of the fact that such filler means should be of an electrically conductive material so as to not interrupt the discharge of electrical potential from the electrode assembly 10 toward the workpiece 36, one particularly satisfactory filler means for the screw slots, herein identified by the numeral 80, are sections of a conductive metal wire 82 of appropriate cross section to be removably received within the slots 80. It will be apparent, of course, that various alternate constructions may be used for filling the slots 80, and alternatively, nonslotted fastening means may be used instead of the screws 72 without departing from the scope of the present invention.

Referring now to the overall process or method of fabricating the electrode assembly 10, in accordance with the principles of the present invention, initially a mold, pattern or the like is provided having or defining a surface which is identical to the final configuration to which the workpiece 36 is to be machined by means of the electrode assembly 10. The pattern or mold may be provided by means of any suitable tool, fixture or the like, and may, in some instances, comprise one of the workpieces 36 which has already been machined to its final or finished shape. Such a pattern is illustrated in FIG. 7 and designated by the numeral 84. The pattern 84 is shown as defining a plurality of facets or face portions, generally designated 86 which are identical in size and shape to the face portions 71 that are to be machined upon the workpiece 36. After the pattern 84 has been properly constructed, the plurality of electrode sections 64 are produced by cutting or otherwise fabricating the sections 64 from a suitable sheet or other shape piece of the electrode material, the electrode sections 64 having their respective end portions, beveled, chamfered or similarly shaped in the manner shown in FIG. 7 such that they may be operatively positioned upon the facets 86 in a position wherein the lower sides thereof contiguously engage the facets 86 in the same manner as the electrode sections 64 will ultimately engage the face portions 71 of the workpiece 36. Before the electrode sections 64 are placed upon the pattern 84 in the manner shown in FIG. 7, preferably some type of parting or release agent is provided on the facets 86, which agent will function to properly temporarily position the electrode sections 64 against any movement relative to one another or relative to the pattern 84, but will permit the electrode sections 64 to be moved away from the facets 86 when a separating force of sufficient magnitude is exerted thereon. Thereafter, the electrode sections 64 are properly oriented upon the facets 86 preparatory to their being transferred to and being mounted upon the electrode holder 42, as will now be described.

Figure 8:
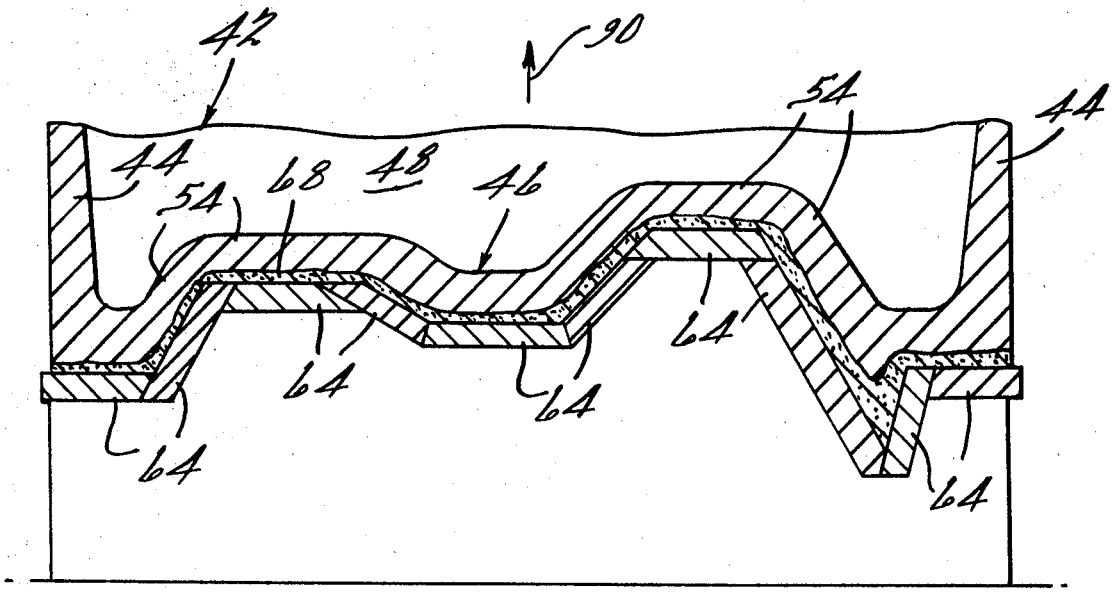
FIG. 8 is a view similar to FIG. 7 showing the electrode holder engaged with the segmental electrode sections during the process of transferring said sections to the holder and forming the permanent reference surface on the holder.

Assuming that the electrode holder 42 is fabricated in a manner such that the portions 54 thereof define the plurality of surface areas 56 corresponding to the facets 86 of the pattern 84, the electrode holder 42 is provided with a layer of the above-described grout material 68 which may be placed upon the surface areas 56 in a relatively generous manner, as indicated in FIG. 7. After the grout 68 has been thus provided on the surface areas 56, the electrode holder 42 is properly positioned above the pattern 84 and electrode sections 64 supported thereon, after which time the electrode holder 42 is biased downwardly or in the direction of the arrow 88 in FIG. 7 from the position shown in FIG. 7 to the position shown in FIG. 8. As the electrode holder 42 is thus moved, it will be seen that the grout material 68 will be biased into engagement with the upper sides of the electrode sections 64 mounted on the pattern 84, whereby the grout 68 will freely flow to a shape or conformation continuously engaged within the confronting or upper surfaces of the electrode sections 64 and thereby form and provide the plurality of surfaces 70 constituting the aforedescribed permanent reference surface upon which the electrode sections 64 are operatively mounted. The grout 68 is of a character such that it will sufficiently bond the electrode sections 64 to the holder 42 with a force greater than the force of the release or parting agent temporarily maintaining the electrode sections 64 positioned upon the pattern 84, with the result that when the electrode holder 42 is moved upwardly away from the pattern 84, or in the direction of the arrow 90 in FIG. 8, the electrode section 64 will be transferred from the facets 86 of the pattern 84 to the holder 42 preparatory to the electrode sections 64 being detachably secured to the electrode holder 42, as above described. It will, therefore, be seen that the process of moving the electrode holder 42 downwardly into engagement with the electrode sections 64 supported upon the pattern 84 and thereafter moving the electrode holder 42 away from the pattern 84 accomplishes two functions; namely, forming the permanent reference surface in the grout material 68 and hence upon the electrode holder 42, and transferring the initial electrode sections 64 from the pattern 84 to the electrode holder 42. After this has been accomplished, the electrode section 64 may be secured in the manner above described to the electrode holder 42 preparatory to the assembly 10 being operatively mounted upon the machine 12.

For certain electrical discharge machining operations, in order to cool the electrode assembly 10 and associated workpiece 36 and to convey the machined particles from the gap or spacing existing between the assembly 10 and workpiece 36, it may be sufficient to merely circulate dielectric fluid within the reservoir 24; however, for other machining applications, it may be desired to directly communicate the dielectric fluid between the manifold chamber 48 and the gap between the assembly 10 and workpiece 36. When this is desired, a plurality of suitable flow passages, generally designated 92, may be formed through the holder support section 46 and electrode sections 64 communicating the chamber 48 with the working or lower side of the electrode sections 64. With this arrangement, dielectric fluid may be communicated either from the chamber 48 to the spacing between the assembly 10 and workpiece 36, and thereafter to the interior of the reservoir 24, or vice versa; the particular direction of dielectric flow therefore being selected with wide latitude in accordance with the particular application at hand.

Figure 6:
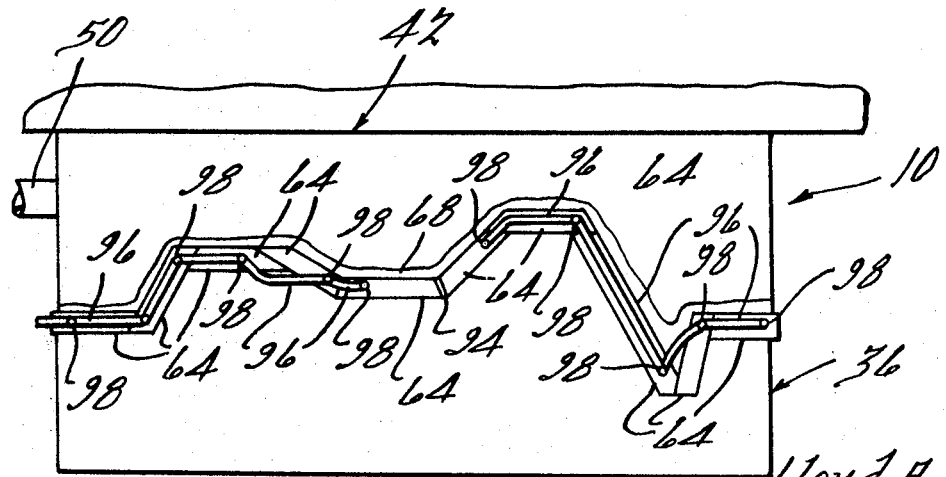
FIG. 6 is a side elevational view of an alternate embodiment of the electrode construction of the present invention.

A particular feature of the present invention resides in the fact that for certain electrical discharging machining operations, an electrical insulating space may be provided between certain of the electrode sections 64 and certain other of said sections 64 so that electrical power of different magnitudes may be communicated to selected electrode sections 64 in order to adapt the assembly 10 for specialized machining operations. More particularly, a space 94 (see FIG. 6) may be provided between, for example, the electrode sections 64 on the right side of the assembly 10 separating said electrode sections from the sections 64 on the left side of the assembly 10. With this arrangement, a greater or higher amperage may be communicated to one side of the assembly 10 than the other side thereof so that different rates of machining may be accomplished simultaneously by different areas of the electrode assembly 10. It will be noted that when the aforesaid spacing 94 is provided between the peripheral edges of one or more of the electrode sections 64 in order to permit the application of a greater or smaller amperage thereto, said spacing 94 may be used to communicate dielectric fluid from a suitable opening in the associated electrode holder section 46 so that dielectric fluid may be communicated between the electrode sections 64 and the manifold chamber 48 via the spacing 94.

Due to the end abutting relationship between the various electrode sections 64, an electrical potential connected to one end thereof will be communicated through the electrode sections 64 to the others thereof, except, however, in the event a gap or spacing is provided between certain of the electrodes for the reasons stated above. If for any reason a more positive electrical communication is desired between the various electrode sections 64, or for situations wherein the configuration of the workpiece necessitates that certain of the electrodes 64 be isolated from others thereof, the assembly 10 may be provided with auxiliary electrical conductors (see FIG. 2) 96 which extend between the electrode sections 64 and are connected thereto by suitable terminal means 98. It will be apparent, of course, that the auxiliary conductors 96 should extend around the outer periphery of the assembly 10 so as to not impair the effectiveness of the electrode sections 64 during an electrical discharge machining operation.

It will be noted that although in the embodiments of the electrode assembly 10 of the present invention illustrated herein, the various electrode sections 64 are arranged so as to define a working surface consisting of a plurality of generally flat or planar surface areas, the present invention, as defined herein, is not intended to exclude a construction wherein the working surface of the electrode sections 64 are of a relatively arcuate or curvilinear configuration. That is, it is contemplated that the various electrode sections utilized in the electrode assembly 10 may define curved working surfaces or may be designed such that a plurality thereof lie along the tangent of a curved surface and are thereby adapted to effect a machining operation on a relatively arcuate shaped surface of an associated workpiece. Such a construction, as will be apparent, might consist of a plurality of rectangularly, triangularly or other shaped electrode sections arranged upon the electrode holder 42 in a manner above described. Accordingly, the present invention will not only find application in machining workpieces having a series of flat or planar facets or surface areas, but also may be used in machining workpieces having curved or arcuate surface areas.

It will be seen from the above that the present invention provides a new and improved electrical discharge machining electrode assembly and method of making same which embodies a number of particularly important features not shown in similar devices of the prior art. One particularly important feature resides in the novel means of providing a permanent reference surface upon which the electrode sections 64 are mounted, which surface permits successive electrode sections to be mounted thereon as they become consumed and serves to automatically and properly orient each electrode section 64 with respect to the corresponding sections without the need for any precision machining or other expensive fabricating techniques. Another particularly important feature of the present invention resides in the fact that different electrode materials may be used simultaneously, and that where desired, different electrical potentials may be supplied to different areas of the assembly 10, thereby providing for universality of application. Still another feature of the present invention resides in the provision of the dielectric manifold chamber defined within the electrode holder 42 which permits dielectric fluid to be transmitted directly to the space between the assembly 10 and its associated workpieces. Yet another feature of the present invention resides in the fact that as the electrode sections 64 become worn, they may be removed and provided with a suitable shim or other structural member which acts to advance the lower or working face thereof downwardly to some preselected position relative to the associated of the electrode sections 64, thereby providing for continued use of an electrode section 64 even though it has become somewhat eroded or worn, and thus effectively extend the operational life thereof.

While it will be apparent that the preferred embodiments illustrated herein are well calculated to fulfill the objects above stated, it will be appreciated that the present invention is susceptible to modification, variation and change without departing from the scope of the invention.

I claim:

1. In an electrical discharge electrode for machining a relatively nonplanar surface on a workpiece,
   a body member defining a relatively irregular mounting surface roughly approximating the contour of surface to be machined on the workpiece,
   a plurality of segmental electrode elements having front and rear sides mounted on said body member, said irregular mounting surface and said plurality of electrode elements together defining spaces,
   said elements being arranged in generally edge-to-edge abutting relationship and together defining a machining surface substantially complementary to the surface to be machined on the workpiece, and
   a layer of material substantially filling the spaces between the rearward sides of said elements and said irregular mounting surface and adapted to have said elements contiguously engaged therewith.

2. The invention as set forth in claim 1 wherein said material between said body member and said electrode elements is bonded to said body member and is detachably engaged with said electrode sections.

3. The invention as set forth in claim 1 wherein said material between said body member and said electrode elements has preselected flow properties such that a reference surface is formed when said body member is urged to engagement with said electrode elements.

4. The invention as set forth in claim 3 wherein said material is selected from the group of thixotropic plastics, ceramics and plaster.

5. The invention as set forth in claim 1 which includes means for detachably securing said electrode elements to said body member, said securing means comprising screw means extending through said electrode elements and threadably engaged with said body member.

6. The invention as set forth in claim 5 wherein said screw means comprise slotted head sections which are recessed below the surface of said electrode elements, and wherein the slots of said screws are adapted to receive a suitable filler means.

7. The invention as set forth in claim 1 which includes means for detachably securing said electrode elements to said body member, said securing means comprising an adhesive material.

8. The invention as set forth in claim 1 wherein said body member includes means defining a dielectric fluid manifold chamber.

9. The invention as set forth in claim 8 which includes passage means extending between said chamber and machining surface of said electrode elements for communicating dielectric fluid therebetween.

10. The invention as set forth in claim 1 wherein some of said electrode elements are abuttingly engageable with one another and are thereby adapted to complete an electrical circuit between one another and other of said elements are disengaged with certain of said elements so as to be electrically isolated from said certain elements.

11. The invention as set forth in claim 10 which includes auxiliary conductor means for completing an electrical circuit between some of said electrode elements.

12. The invention as set forth in claim 1 wherein the marginal edge of one of said electrode elements is spaced away from the marginal edge of the adjacent of said electrode elements for electrically insulating said one section from the other of said sections.

13. The invention as set forth in claim 11 wherein said electrode elements are adapted to be connected to a power source via first and second electrical power circuit means for communicating electrical energy to said some of said electrode elements and said isolated elements, respectively, whereby electrical energy of different magnitudes may be communicated to said electrode elements.

14. The invention as set forth in claim 12 wherein the marginal edges of said one electrode elements and the marginal edges of said other electrode elements define a recessed gap, and which includes means for communicating dielectric fluid from a source thereof through said gap.

15. The invention as set forth in claim 1 wherein said electrode elements are fabricated of different materials so as to be consumed at different rates during operation of the associated electrical discharge machine.

16. The invention as set forth in claim 12 wherein at least one of said electrode elements is oriented generally parallel to the direction of movement of the electrode, said one electrode element being fabricated of a more wear resistant material than the other of said electrode elements.

17. The invention as set forth in claim 1 wherein said body member defines a multiple faceted mounting surface, and which includes at least one electrode element adapted to be detachably secured to each of the facets of said mounting surface.

18. In an electrical discharge electrode movable toward and away from a workpiece for machining a relatively nonplanar surface thereon,
   a body member defining a relatively irregular mounting surface roughly approximating the contour of surface to be machined on the workpiece,
   a plurality of generally flat, uniform thickness segmental electrode elements having front and rear sides mounted on said body member, said irregular mounting surface and said plurality of electrode elements together defining spaces,
   said elements being arranged in generally edge-to-edge abutting relationship and together defining a machining surface complementary to the surface to be machined on the workpiece, and
   a layer of material substantially filling the spaces between the rearward sides of said elements and said irregular mounting surface and adapted to have said elements contiguously engaged therewith,
   at least one of said electrode elements being generally coplanar with the direction of movement of the electrode toward and away from the workpiece, with said one electrode element being fabricated of electrode material having increased wear resistance as compared to other of said electrode elements.

19. In an electrical discharge electrode for machining a relatively nonplanar surface on a workpiece,
   a body member defining a relatively irregular mounting surface roughly approximating the contour of surface to be machined on the workpiece,
   a plurality of segmental electrode elements having front and rear sides mounted on said body member, said irregular mounting surface and said plurality of electrode elements together defining spaces,
   said elements being arranged in generally edge-to-edge abutting relationship and together defining a machining surface complementary to the surface to be machined on the workpiece, and
   a layer of material substantially filling the spaces between the rearward sides of said elements and said irregular mounting surface and adapted to have said elements contiguously engaged therewith,
   at least some of said electrode elements being fabricated of different electrode materials, whereby said electrode elements will be consumed at different rates during a machining operation.

20. In an electrical discharge machine including first and second power sources,
   an electrode for machining a relatively nonplanar surface on a workpiece, said electrode comprising,
   a body member defining a relatively irregular mounting surface roughly approximating the contour of surface to be machined on the workpiece,
   a plurality of generally flat, uniform thickness segmental electrode elements having front and rear sides mounted on said body member, said irregular mounting surface and said plurality of electrode elements together defining spaces,
   said elements being arranged in generally edge-to-edge abutting relationship and together defining a machining surface complementary to the surface to be machined on the workpiece,
   a layer of material substantially filling the spaces between the rearward sides of said elements and said irregular mounting surface and adapted to have said elements contiguously engaged therewith,
   at least one of said electrode elements being electrically insulated from other of said electrode elements, and
   first circuit means connecting said insulated element to said first power source and second circuit means for connecting other of said electrode elements to said second power source.

21. In an electrical discharge electrode for machining a relatively nonplanar surface on a workpiece,
   a body member defining a relatively irregular mounting surface roughly approximating the contour of surface to be machined on the workpiece,
   a plurality of generally flat, uniform thickness segmental electrode elements having front and rear sides mounted on said body member, said irregular mounting surface and said plurality of electrode elements together defining spaces,
   said elements being arranged in generally edge-to-edge abutting relationship and together defining a machining surface complementary to the surface to be machined on the workpiece, and
   a layer of material substantially filling the spaces between the rearward sides of said elements and said irregular mounting surface and adapted to have said elements contiguously engaged therewith,
   the edges of at least some of said electrode elements being coplanar with one of the sides of adjacent of said electrode elements, whereby to provide a substantially continuous machining surface complementary to the surface to be machined on the workpiece.

22. In an electrical discharge electrode for machining a relatively nonplanar surface on a workpiece,
   a body member defining a relatively irregular mounting surface roughly approximating the contour of surface to be machined on the workpiece,
   a plurality of generally flat, uniform thickness segmental electrode elements having front and rear sides mounted on said body member, said irregular mounting surface and said plurality of electrode elements together defining spaces,
   said elements being arranged in generally edge-to-edge abutting relationship and together defining a machining surface complementary to the surface to be machined on the workpiece, and
   a layer of material substantially filling the spaces between the rearward sides of said elements and said irregular mounting surface and adapted to have said elements contiguously engaged therewith,
   said material being of a generally thixotropic character and thereby being initially deformable upon engagement of said electrode elements therewith and upon curing thereof defining the permanent surface upon which said electrode elements may be detachably secured.